(12) United States Patent
Shimura et al.

(10) Patent No.: US 7,079,587 B2
(45) Date of Patent: Jul. 18, 2006

(54) SIGNAL TRANSMITTER HAVING VOLTAGE BOOSTER CIRCUIT AND METHOD OF OPERATING THE SAME

(75) Inventors: Tokio Shimura, Kariya (JP); Hiroyuki Kitagawa, Aichi-gun (JP)

(73) Assignee: Denso Corporation, Kariya (JP)

( * ) Notice: Subject to any disclaimer, the term of this patent is extended or adjusted under 35 U.S.C. 154(b) by 776 days.

(21) Appl. No.: 09/928,405

(22) Filed: Aug. 14, 2001

(65) Prior Publication Data

US 2002/0039079 A1   Apr. 4, 2002

(30) Foreign Application Priority Data

Sep. 29, 2000   (JP) ............................. 2000-300141

(51) Int. Cl.
*H04L 27/10* (2006.01)

(52) U.S. Cl. ...................... 375/295; 375/150; 375/142; 375/147; 375/349; 370/242; 370/204; 370/206; 370/342

(58) Field of Classification Search ................ 370/242, 370/204, 206, 342; 396/106, 277, 272; 345/82; 367/175; 375/295, 150, 142, 147, 349; 340/825; 327/536
See application file for complete search history.

(56) References Cited

U.S. PATENT DOCUMENTS

| 4,652,108 | A | * | 3/1987 | Iida et al. .................... 396/106 |
| 4,881,148 | A | * | 11/1989 | Lambropoulos et al. .... 361/172 |
| 4,964,073 | A | * | 10/1990 | Watanabe .................... 713/321 |
| 5,523,746 | A | * | 6/1996 | Gallagher .................. 340/5.61 |
| 5,889,732 | A | * | 3/1999 | Fukuyama et al. ......... 367/175 |
| 6,060,942 | A | * | 5/2000 | Oh .............................. 327/536 |
| 6,091,711 | A | * | 7/2000 | Fukuda ....................... 370/242 |
| 6,292,107 | B1 | * | 9/2001 | Yamaura et al. ....... 340/825.69 |
| 6,519,419 | B1 | * | 2/2003 | Shimada et al. ............ 396/277 |
| 6,628,252 | B1 | * | 9/2003 | Hoshino et al. .............. 345/82 |

FOREIGN PATENT DOCUMENTS

| JP | A-8-293813 | 11/1996 |
| JP | A-9-294368 | 11/1997 |

* cited by examiner

*Primary Examiner*—Chieh M. Fan
*Assistant Examiner*—Eva Zheng
(74) *Attorney, Agent, or Firm*—Posz Law Group, PLC

(57) ABSTRACT

In a radio signal transmitter, a microcomputer operates by receiving an output voltage of a battery to sequentially generate a voltage boosting control signal. This voltage boosting control signal has a longer high level period as generated later. The voltage booster circuit boosts the output voltage of the battery by increasing the number of times of oscillating operations during the high level period of the voltage boosting control signal depending on the increased high level period.

15 Claims, 6 Drawing Sheets

SIGNAL TRANSMITTER HAVING VOLTAGE BOOSTER CIRCUIT AND METHOD OF OPERATING THE SAME

CROSS REFERENCE TO RELATED APPLICATION

This application is based on and incorporates herein by reference Japanese Patent Application No.2000-300141 filed on Sep. 29, 2000.

BACKGROUND OF THE INVENTION

The present invention relates to a signal transmitter, which is suitable for employment, for example, of keyless entry system for vehicles, and a method of operating the signal transmitter.

In a keyless entry system installed, for example, in an automobile, doors of an automobile are usually locked or unlocked with transmission of data by using radio signals. Here, the signal transmitter includes a voltage booster circuit for the stable transmission of radio signal. An output voltage of a small capacity battery such as a button battery or the like is boosted up to a predetermined voltage higher than such an output voltage. Thereby, the data is transmitted using the radio signal with such a boosted voltage Vb.

However, if the output voltage of the battery is lowered due to deterioration by aging of the battery, difference between the output voltage and the predetermined boosted voltage Vb increases. Thereby, since a large amount of power of battery is consumed when the output voltage is boosted by the voltage booster circuit, the output voltage of the battery which is a power supply voltage of a microcomputer momentarily becomes lower than the lower limit value of the operation voltage range of the microcomputer. As a result, it is likely that the microcomputer can no longer operate normally and operation life of the signal transmitter may be shortened.

It is therefore proposed to intermittently control the boosted voltage of the voltage booster circuit at fixed intervals by a microcomputer. Thus, the voltage booster circuit provides intermittently periods where the battery power is not consumed so that the output voltage of battery does not lower the lower limit value of the operation voltage range of the microcomputer. The boosted voltage gradually rises and reduction of the output voltage of the battery is reduced. However, it is insufficient to only intermittently control the boosted voltage of the voltage booster circuit at fixed intervals.

First, the voltage boosting characteristic of the voltage booster circuit is not uniform because of difference of specifications and fluctuation in manufacture. Therefore, the starting time of voltage boosting is different depending on the voltage booster circuit employed. Moreover, this starting time of voltage boosting changes depending on temperature. Therefore, difference arises in the degree of reduction of the output voltage of the battery during the voltage boosting operation depending on the voltage booster circuit employed.

This point will be explained in detail with reference to FIGS. 7A to 7C, which show variation in operation of different voltage booster circuits. It is assumed in these figures that a voltage boosting control signal Vbc is outputted to a voltage booster circuit from a microcomputer in order to instruct the voltage booster circuit to execute the voltage boosting operation. This voltage booster circuit boosts a battery voltage VB by oscillating operation during the period where the voltage boosting control signal Vbc becomes high level. During the low level period, this voltage booster circuit does not oscillate. The voltage boosting control signal Vbc is the same voltage boosting control signal Vbc in the predetermined period in such a case that the voltage boosting operation of the voltage booster circuit is controlled by the microcomputer.

Although not illustrated here, the voltage boosting control signal Vbc is a repetitive signal of a fixed interval and is outputted to the voltage booster circuit from the microcomputer. That is, the high level period and low level period of the voltage boosting control signal Vbc are fixed.

Figure 7A:
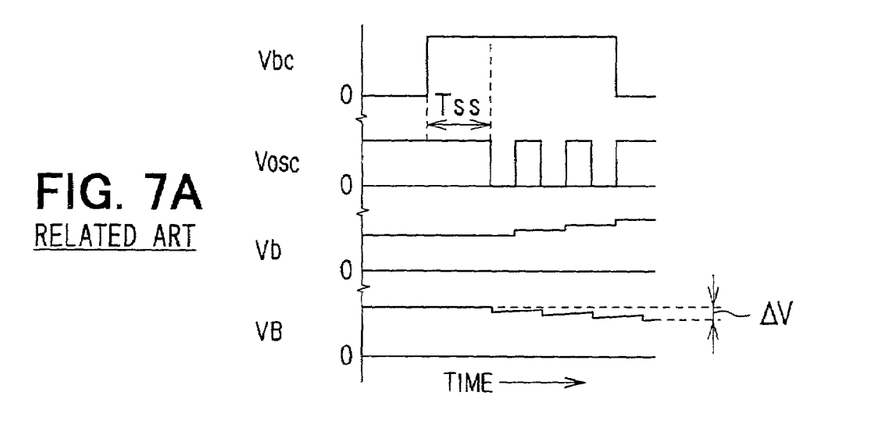
FIGS. 7A to 7C are signal diagrams showing voltage boosting control signal, oscillation pulse signal, boosted voltage and battery output voltage developed with different starting times in the related art.

Here, FIG. 7A illustrates the change of the oscillation pulse signal Vosc and the boosted voltage Vb of the voltage booster circuit and reduction in the output voltage VB of the battery in such a case that the starting time Ts of voltage boosting of the voltage booster circuit is equal to the standard time Tss. FIG. 7B illustrates the change of the oscillation pulse signal Vosc and the boosted voltage Vb of the voltage booster circuit and reduction in the output voltage VB of the battery in such a case that the starting time Tse of voltage boosting of the voltage booster circuit is shorter than the standard time Tss. Moreover, FIG. 7C illustrates the change of the oscillation pulse signal Vosc and the boosted voltage Vb of the voltage booster circuit and reduction in the output voltage VB of the battery in such a case that the starting time Tsd of voltage boosting of the voltage booster circuit is longer than the standard time Tss.

Here, the starting time Ts of voltage boosting means the period until the voltage booster circuit starts the oscillating operation from the input of the voltage boosting control signal Vbc to the voltage booster circuit.

Figure 7B:
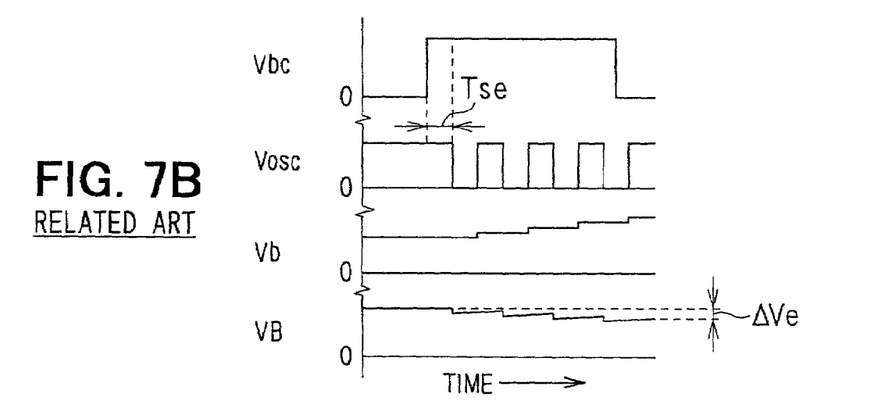
Figure 7C:
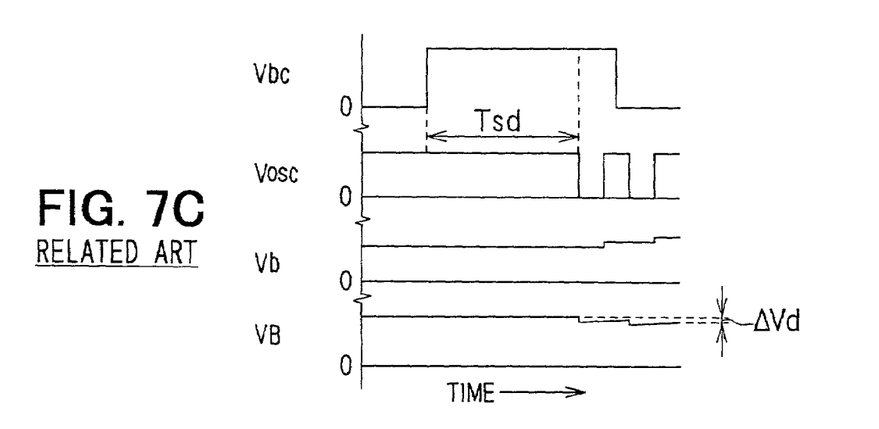

Under the condition that the voltage boosting control signal Vbc is in the high level in FIGS. 7A to 7C, if the starting time of voltage boosting of the voltage booster circuit is equal to the shorter time Tse, the number of oscillating pulses of the oscillation pulse signal Vosc is larger than the number of oscillation pulses of the oscillating pulse signal Vosc in the standard time Tss. Therefore, the boosting degree of the boosted voltage Vb is larger than the that of the boosted voltage Vb in the case where the starting time of voltage boosting is equal to the standard time Tss. However, the reduction degree ($\Delta$ve) of the output voltage VB of the battery is larger than $\Delta$V of the output voltage VB of the battery in the case where the starting time of voltage boosting is equal to the standard time Tss.

In addition, when the starting time of voltage boosting of the voltage booster circuit is equal to the longer time Tsd, the number of pulses of the oscillating pulse signal Vosc is less than the number of oscillating pulses of the oscillation pulse signal Vosc. Therefore, the boosting degree of the boosted voltage Vb is smaller than that of the boosted voltage Vb in the case where the starting time of voltage boosting is equal to the standard time Tss. However, the reduction degree ($\Delta$Vd) of the output voltage VB of the battery is also smaller than that of the output voltage VB of battery when the starting time of voltage boosting is equal to the standard time Tss.

Accordingly, the longer the starting time of voltage boosting is, the smaller the reduction degree of the output voltage VB of the battery becomes. Thereby, the output voltage VB of the battery does not readily become lower than the lower limit value of the operation voltage range of the microcomputer. On the contrary, a longer time is required until the output voltage rises up to the predetermined voltage. Meanwhile, the shorter the starting time of voltage boosting is, the larger the reduction degree of the output voltage VB of the battery becomes. Thereby, a longer time is not required until the voltage rises up to the predetermined value. On the contrary, the output voltage VB of the battery is readily lowered below the lower limit value of the operation voltage range of the microcomputer.

Figure 6:
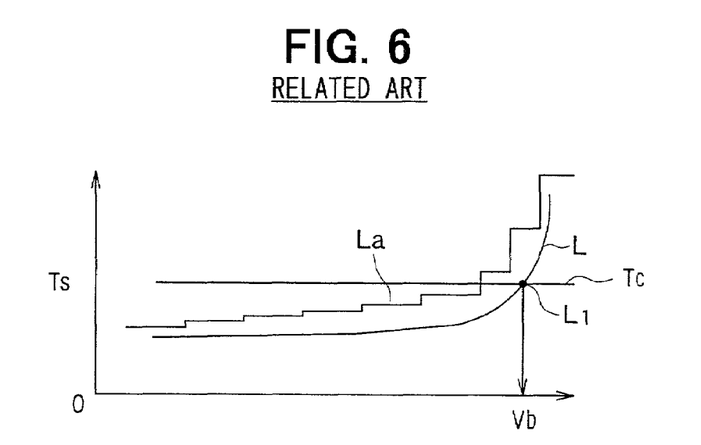
FIG. 6 is a graph indicating the relationship between a starting time of voltage boosting of a voltage booster circuit and a boosted voltage in a related art.

FIG. 6 shows a characteristic curve L identifying the relationship between the starting time Ts of voltage boosting and the boosted voltage Vb as the qualitative common characteristic of the voltage booster circuit. This characteristics is derived from the relationship between the starting time Ts of voltage boosting of each voltage booster circuit and the boosted voltage Vb. The characteristic curve L indicates that fluctuation exists in the characteristic of each voltage booster circuit but the starting time Ts of voltage boosting is rather short and almost does not change in the range where the boosted voltage Vb is low and the starting time Ts of voltage boosting rapidly becomes long when the boosted voltage Vb becomes high. It is thus understood that the starting time Ts of voltage boosting becomes longer when the boosted voltage Vb becomes near the predetermined voltage irrespective of the specification of the voltage booster circuit.

Therefore, when the high level period of the voltage boosting control signal Vbc is fixed to the constant value (Tc in FIG. 6), this high level period of the voltage boosting control signal Vbc matches with the starting time of voltage booting. Thus, the boosted voltage Vb saturates (L1 in FIG. 6) and does not rise and thereby the boosted output of the voltage booster circuit does not reach the predetermined boosted voltage Vb. This phenomenon arises at a lower boosted voltage Vb when the high level period of the voltage boosting control signal Vbc is shorter.

It is understood from the characteristic La shown in FIG. 6 that when the high level period of the voltage boosting control signal Vbc is set longer step by step considering that the starting time of voltage boosting becomes longer for the boosted voltage Vb on the characteristic curve L, saturation of the boosted voltage Vb can be prevented. It also becomes possible to prevent that the output voltage of deteriorated battery momentarily becomes lower than the lower limit value of the operation voltage range of the microcomputer.

SUMMARY OF THE INVENTION

It is therefore an object of the present invention to provide a signal transmitter and a method of operating the same, which can acquire an adequate voltage required for controlling a voltage booster circuit irrespective of difference of specifications of voltage booster circuits as well as fluctuation and change of the voltage boosting characteristics, even if an output voltage is lowered due to deterioration of a small capacity battery.

According to the present invention, a voltage boosting control signal is generated to have a boosting allowing period and a boosting inhibiting period following the signal generation allowing period. An output voltage of a battery is boosted by a switching operation during the signal generation allowing period, so that a radio signal may be transmitted with the boosted voltage. The signal generation allowing period is increased as time passes to increase the number of the switching operation in each signal generation allowing period.

BRIEF DESCRIPTION OF THE DRAWINGS

The above and other objects, features and advantages of the present invention become more apparent from the following detailed description made with reference to the accompanying drawings. In the drawings.

DETAILED DESCRIPTION OF THE PREFERRED EMBODIMENT

Figure 1:
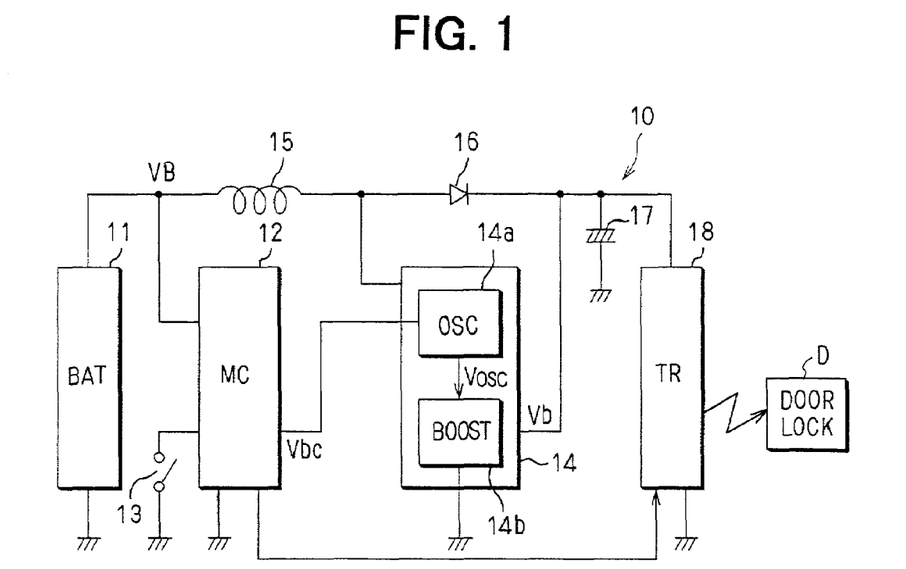
FIG. 1 is a block diagram of a signal transmitter according to a preferred embodiment of the present invention.

Referring to FIG. 1, a hand-held signal transmitter 10 is for a keyless entry system for automobile. This keyless entry system locks or unlocks the doors of the automobile with a door-lock device D installed in the automobile using a radio signal of the signal transmitter 10.

The signal transmitter 10 is provided with a battery (BAT) 11 such as a button-type battery. It may be a small capacity battery such as a silver battery, a lithium battery or the like. In this embodiment, a CR2032-type button battery of nominal voltage VB of 3V and nominal capacity of 220 mAh is used as the battery 11.

The signal transmitter 10 is provided with a microcomputer (MC) 12. This microcomputer 12 is operated when a d.c. voltage VB is applied as the power source voltage from the battery 11. The microcomputer 12 executes, in its operating condition, a computer program shown in FIG. 2 to FIG. 4 while a start switch 13 is held turned on. During the execution of the computer program, the processes required for control of a voltage booster circuit 14 and a transmitter circuit (TR) 18 are executed. This computer program is stored in a ROM of the microcomputer 12. The start switch 13 is composed of a normally-open switch. When this start switch 13 is turned on, the microcomputer 12 is activated.

Figure 5:
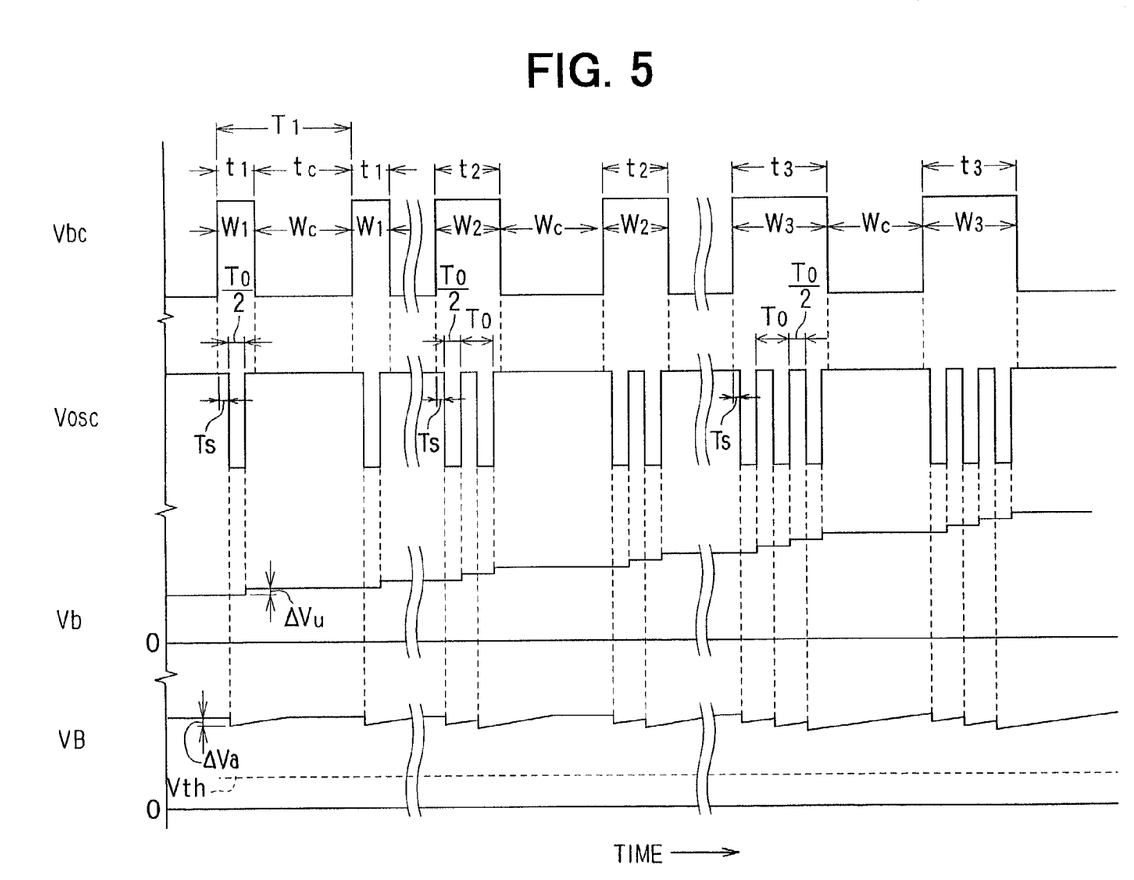
FIG. 5 is a signal diagram indicating a voltage boosting control signal of the microcomputer, an oscillation pulse signal in a voltage booster circuit, a boosted voltage and a battery output voltage in the embodiment.

The voltage booster circuit 14 is provided with an oscillator circuit (OSC) 14a and a voltage booster circuit 14b as major structural components. The voltage booster circuit 14 allows input of the voltage VB from the battery 11 via a reactor 15. Upon input of an oscillation control signal (boosting control signal) Vbc of a first fixed frequency from the microcomputer 12, the voltage booster circuit 14 oscillates and generates an oscillation pulse signal Vosc at every predetermined period T1 (FIG. 5). This time period is so determined to correspond to a second fixed frequency which is higher than the first fixed frequency. However, in this embodiment, the low level period is identical to the high level period in this oscillation pulse signal Vosc. The voltage booster circuit 14b boosts the voltage VB from the battery 11 via the reactor 15 to a predetermined voltage Vb (for example, 5V) based on the oscillation output Vosc of the oscillator circuit 14a.

Here, the voltage booster circuit 14 has the voltage boosting characteristic which is uniquely determined by the specifications thereof. This characteristic identifies the relationship between the starting time Ts of voltage boosting and the boosted voltage Vb. The oscillator circuit 14a starts the oscillating operation when the starting time Ts of voltage boosting has passed after the input of the oscillation control signal Vbc from the microcomputer 12 (corresponding to the first falling time of the oscillation pulse signal Vosc). The reactor 15 operates to control change of the output VB of the battery 11.

A smoothing capacitor 17 smoothes the boosted voltage Vb from the voltage booster circuit 14b of the voltage booster circuit 14 and applies the smoothed voltage to the transmitter circuit 18. Between the smoothing capacitor 17 and reactor 15, a diode 16 is connected. This diode 16 restricts a reverse flow of current based on the boosted voltage Vb in the voltage booster circuit 14 to the reactor 15.

The transmitter circuit 18 is provided with a signal processing circuit and an antenna. This transmitter circuit 18 is rendered operative based on the output voltage from the smoothing capacitor 17 under the control of the microcomputer 12. It processes the data (RF data indicating lock or unlock of door) from the microcomputer 12 with the signal processing circuit as the transmitting data and transmits this transmitting data from the antenna to the door lock device D using a radio signal. This RF data is a radio frequency data and the process of the signal process circuit is realized by generating the transmitting data by modulating the carrier with the RF data.

Figure 2:
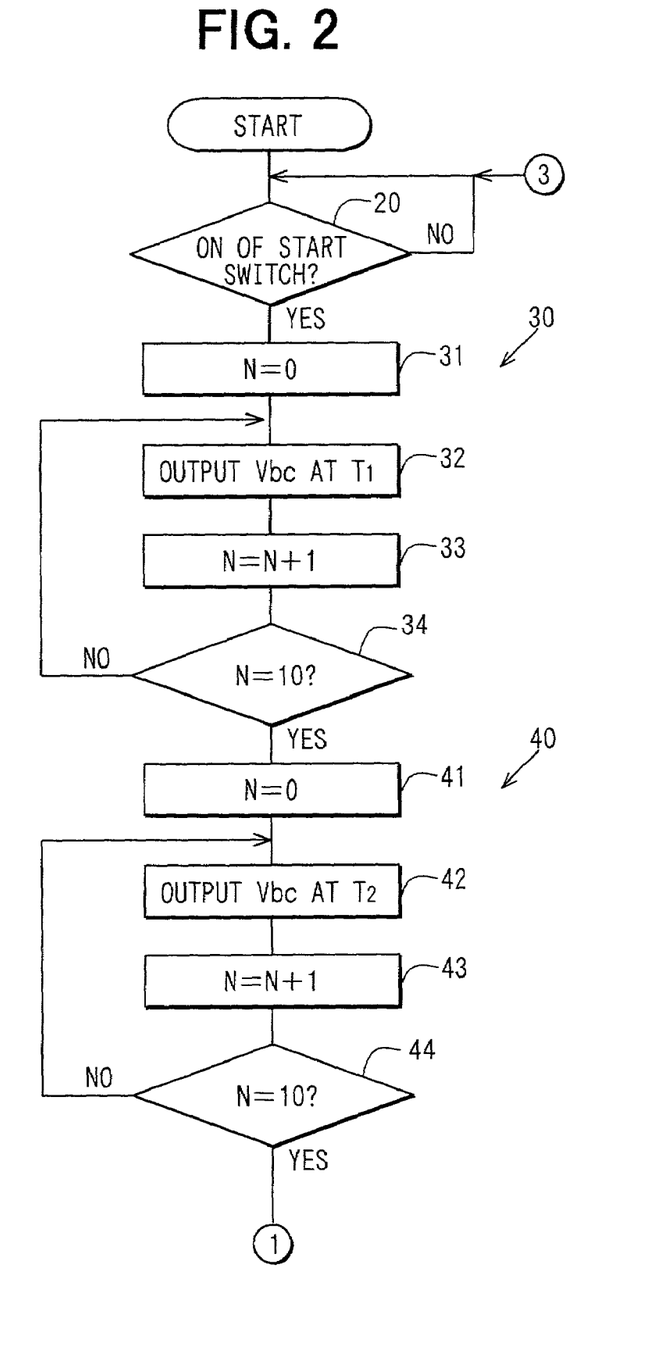
FIG. 2 is a flow diagram showing a first part of operations of a microcomputer used in the embodiment.
Figure 3:
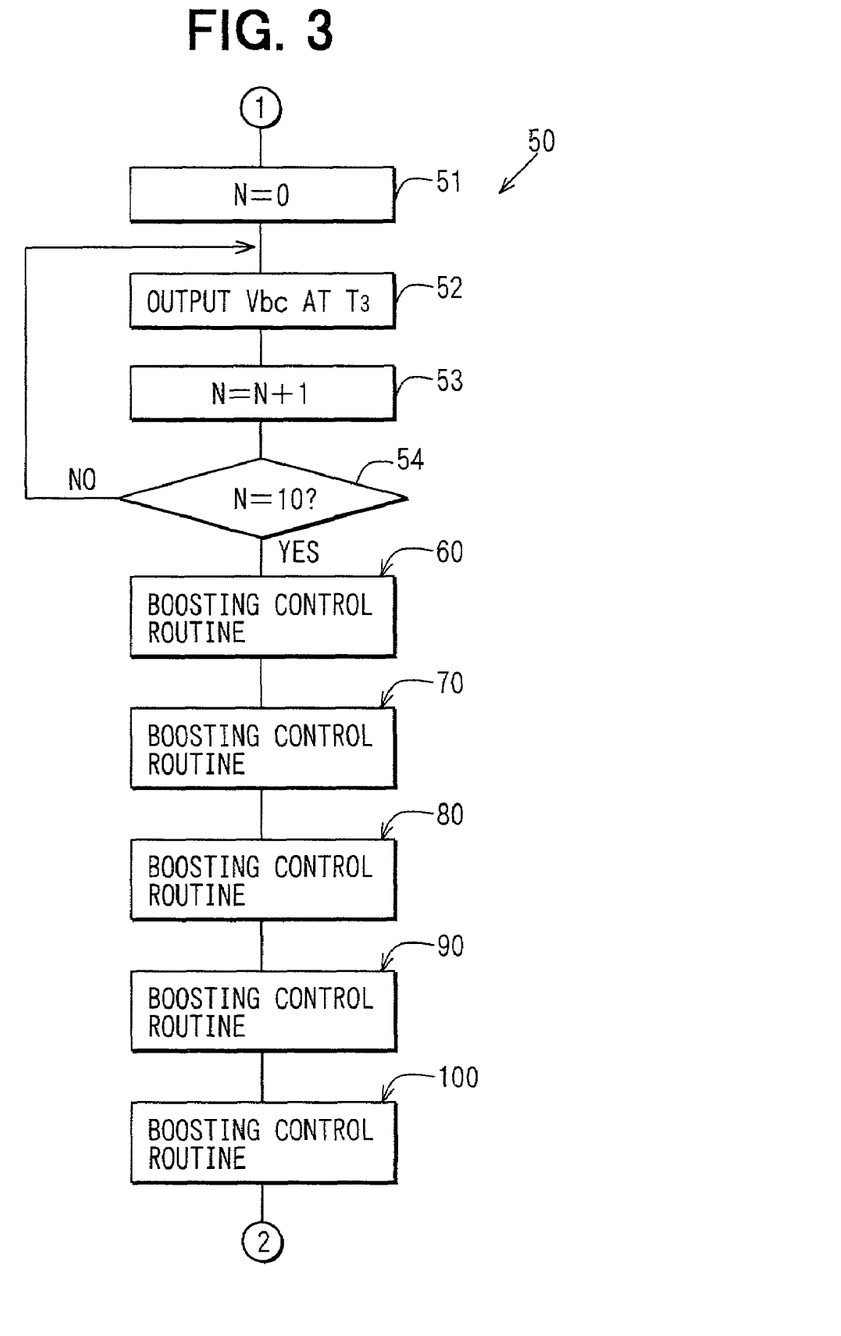
FIG. 3 is a flow diagram showing a second part of operations of the microcomputer.
Figure 4:
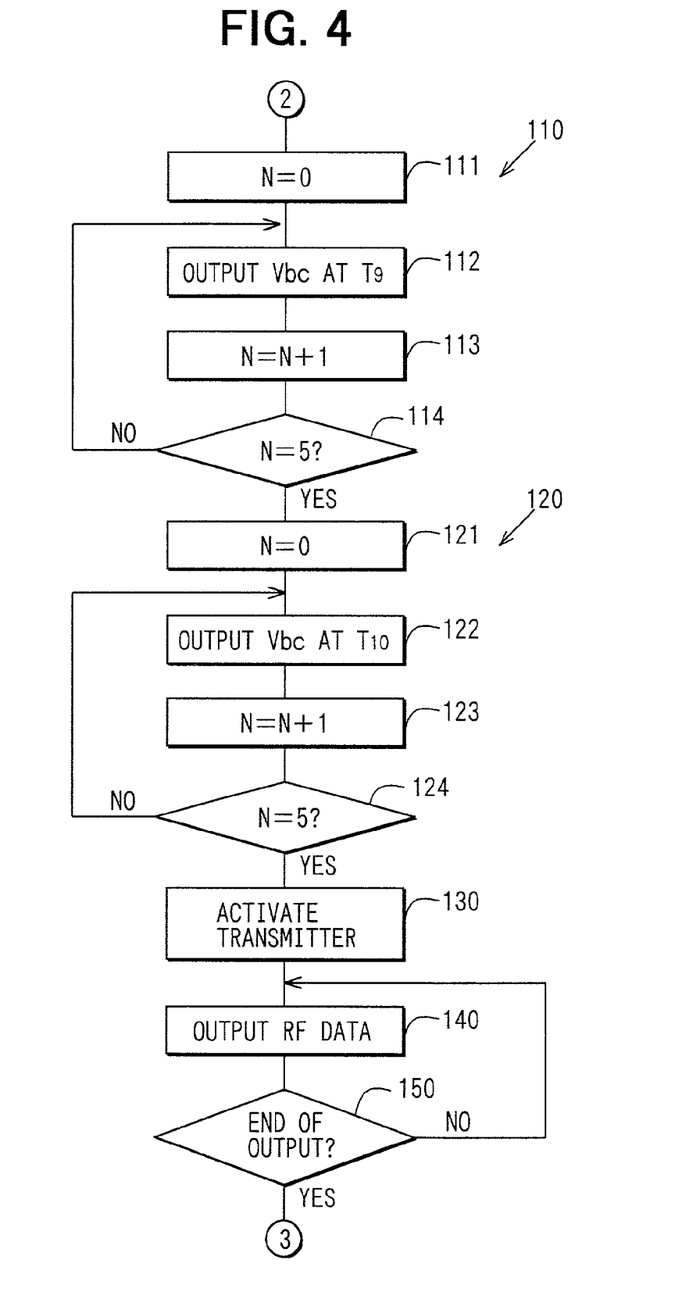
FIG. 4 is a flow diagram showing a third part of operations of the embodiment.

The microcomputer 12 executes the program shown in FIGS. 2 to 4.

It repeats determination of NO at step 20 when the start switch 13 is held turned off. Thereafter, when the start switch 13 is turned on, the microcomputer 12 determines YES at step 20 and thereafter starts the voltage boosting control process routine 30. In this voltage boosting control process routine 30, the count data N is cleared to 0 (N=0) at step 31. The pulse signal is outputted at every predetermined period T1 as the voltage boosting control signal Vbc at step 32.

Here, the voltage boosting control signal Vbc has the high level pulse width W1 and low level pulse width Wc as illustrated in FIG. 5. The pulse width W1 corresponds to a predetermined time t1, while the pulse width Wc corresponds to a predetermined time tc. However, the predetermined time t1 is set to the value in the range of Ts+0.5×To<t1<Ts+To. Here, To is the one cycle period of the oscillation pulse signal Vosc. Moreover, Ts is the starting time of voltage boosting of the voltage booster circuit 14. The predetermined time tc corresponds to the time to recover to the value before the drop of the voltage VB which is momentarily and repeatedly lowered due to consumption of power of the battery 11 in each routine of the subsequent voltage boosting control routines 40 to 120 including the voltage boosting control routine 30.

When the first voltage boosting control signal Vbc of the period T1 is outputted from the microcomputer 12, the voltage boosting control signal Vbc is inputted to the oscillator circuit 14a in the voltage booster circuit 14.

Thereafter the oscillating operation is started after the starting time Ts of voltage boosting has passed to generate the oscillation pulse signal Vosc of period To. Here, the predetermined time t1 corresponding to the pulse width W1 of the high level of the voltage boosting control signal Vbc is set to the value in the range of Ts+0.5×To<t1<Ts+To, only one oscillation pulse signal Vosc is outputted from the oscillator circuit 14a during the predetermined period t1.

Therefore, in the voltage booster circuit 14, the voltage booster circuit 14b boosts the voltage VB applied from the battery 11 via the reactor 15 only as much as the voltage ΔVu (FIG. 5) when the oscillation pulse signal Vosc from the oscillator circuit 14a rises. Moreover, before this voltage boosting, the power supplied from the battery 11 via the reactor 15 is consumed in response to the fall of the oscillation pulse signal Vosc from the oscillator circuit 14a. Therefore, the voltage VB of battery 11 drops as much as only ΔVa (FIG. 5) in response to rise of the oscillation pulse signal Vosc from the oscillator circuit 14a.

The voltage boosting control signal Vbc of period T1 falls with elapse of the predetermined time t1 and maintains its low level until the predetermined time tc passes. This predetermined time tc is set to the time which assures recovery of the voltage VB to the value before drop thereof due to the power consumption of the battery 11. Therefore, the voltage VB of the battery 11 is recovered to the value before the drop thereof from the condition where the voltage VB drops by ΔVa.

When the process of step 32 is completed, the count data N is incremented as N=N+1=1 at step 33. The determination at step 34 is NO because N<1. Thereafter, the process steps 32 to 34 are repeated until N=10, that is, until the boosting control signal Vbc is produced ten times.

Thereby, the voltage boosting by the voltage booster circuit 14b is repeated in unit of voltage ΔVu until N=10 based on the voltage VB from the reactor 15 by repeatedly outputting the voltage boosting control signal Vbc of period T1. The repetitive rise of the boosted voltage Vb is always conducted under the recovery condition of the voltage VB of the battery 11 as explained above. The starting time Ts in the predetermined time t1 corresponding to each N after N=2 corresponds to the starting time of voltage boosting of the voltage booster circuit 14 immediately after N is set.

When the determination at step 34 is YES (N=10), the process of the voltage boosting control process routine 40 is started. Thereby, at step 41, the count data N is cleared to 0 (N=0) and the pulse signal of the predetermined period T2 is outputted as the voltage boosting control signal Vbc at step 42. Here, as illustrated in FIG. 5, the voltage boosting control signal Vbc of period T2 has the high level pulse width W2 and low level pulse width Wc and the pulse width W2 corresponds to a predetermined time t2. However, the predetermined time t2 is set to the value within the range of Ts+1.5×To<t2<Ts+2To. Moreover, Ts corresponds to the starting time of voltage boosting of the voltage booster circuit 14 immediately after the determination at step 34 turns to YES.

When the voltage boosting control signal Vbc of period T2 is first outputted from the microcomputer 12, the voltage booster circuit 14 starts the oscillating operation when the starting time Ts of voltage boosting has passed after the input of the voltage boosting control signal Vbc from the oscillator circuit 14a and generates the oscillation pulse signal Vosc in the period To. Here, the predetermined time t2 corresponding to the high level pulse width W of the voltage boosting control signal Vbc is set to the value in the range of Ts+1.5×To<t2<Ts+2To. Therefore, the number of the oscillation pulses outputted from the oscillator circuit 14a during the predetermined time t2 is less than 2 but 1.5 or larger.

Therefore, in the voltage booster circuit 14, the voltage booster circuit 14b raises the voltage VB applied from the battery 11 via the reactor 15 in unit of the voltage A Vu for every rise of the oscillation pulse signal Vosc from the oscillator circuit 14a. Moreover, the power supplied from the battery 11 via the reactor 15 is consumed, before this boosting of voltage, for every fall of the oscillation pulse signal Vosc from the oscillator circuit 14a, the voltage VB of battery 11 drops twice in unit of the voltage ×Va for every fall of the oscillation pulse signal Vosc from the oscillator circuit 14a.

The voltage boosting control signal Vbc of period T2 falls with elapse of the predetermined time t2 and maintains the low level until the predetermined period tc passes. This predetermined time tc is set to the time to recover to the value before the drop of voltage VB even when such voltage VB drops momentarily with consumption of power of battery 1. Therefore, the voltage VB of battery 11 is recovered to the value before the drop of voltage from the condition where the voltage of 2ΔV is lowered.

When the process of step 42 is completed, the count data N is updated through addition as N=N+1=1 at step 43. At step 44, determination is NO because N<10. Thereafter, steps 42 to 44 are repeated until N=10. Thereby, the boosted voltage Vb of the voltage booster circuit 14b is boosted repeatedly in unit of 2ΔVu until N=10 based on the voltage VB from the reactor 15. The repetitive voltage boosting of the boosted voltage Vb is always conducted under the condition that the voltage VB of battery 11 is recovered as explained above. Ts in the predetermined time t2 corresponding to each N after N=2 corresponds to the starting time of voltage boosting of the voltage booster circuit 14b immediately after the N is set up.

However, when N=10 and the determination at step 44 is YES, the process of the next voltage boosting control routine 50 (FIG. 3) is started. Thereby, the count data N is cleared (N=0) at step 51 and the pulse signal of the predetermined period T3 is outputted at step 52 as the voltage boosting control signal Vbc. Here, the voltage boosting control signal Vbc of period T3 has the high level pulse width W3 and low level pulse width Wc as illustrated in FIG. 5. The pulse width W3 corresponds to a predetermined time t3. However, the predetermined time t3 is set to the value in the range of Ts+2.5×To<t2<Ts+3To.

When the first voltage boosting control signal Vbc of period T3 is outputted under the control of microcomputer 12, the oscillator circuit 14a starts the oscillating operation and generates the oscillation pulse signal Vosc of period To in the voltage booster circuit 14 when the starting time Ts of voltage boosting has passed after the voltage boosting control signal Vbc is inputted to the oscillator circuit 14a.

Here, since the predetermined time t3 corresponding to the high level pulse width W3 of the voltage boosting control signal Vbc is set to the value within the range of Ts+2.5×To<t3 <Ts+3To as explained above, the number of oscillation pulse signals Vosc outputted from the oscillator circuit 14a during the predetermined t3 is under 3 but is 2.5 or larger.

Accordingly, the voltage booster circuit 14b in the voltage booster circuit 14 boosts the voltage VB applied from the battery 11 via the reactor 15 in unit of the voltage A Vu for every rise of the oscillation pulse signal vosc.

Moreover, since the power supplied from the battery 11 via the reactor 15 is consumed for every fall of the oscillation pulse signal Vosc from the oscillator circuit prior to this voltage boosting, the voltage VB of the battery 11 drops for three times in unit of the voltage ΔVa for every fall of the oscillation pulse signal Vosc from the oscillator circuit 14a.

The voltage boosting control signal Vbc of period T3 rises as the predetermined time t3 has passed and remains at the low level until the predetermined time tc passes. This predetermined time tc is set, as explained above, to the time for recovery to the value before drop of the voltage VB even if such voltage VB is repeatedly lowered momentarily due to the consumption of the power of battery 11. Therefore, the voltage VB of battery 11 recovers to the value before the drop from the value where the voltage 3ΔVa is reduced.

When the process of step 52 is completed, the count data N is updated through the addition of N=N+1 at step 53. The determination is NO at step 54 because N<10. Thereafter, the steps 52 to 54 are repeated until N=10. Thereby, the boosted voltage Vb of the voltage booster circuit 14b is boosted repeatedly in unit of the voltage A Vu until N=10 based on the voltage VB from the reactor 15.

The repeated boosting of the voltage is always performed under the recovery condition of the voltage VB of battery 11 as explained above. Ts in the predetermined time t3 corresponding to each N after N=2 corresponds respectively to the starting time of voltage boosting of the voltage booster circuit 14 immediately after the setting of N.

The processes of the voltage boosting control routines 60 to 100 are sequentially conducted. In these voltage boosting control routines 60 to 100, the processes which are substantially same as those in the voltage boosting control routines 30 to 50 are executed except for the following processes.

That is, in the voltage boosting control routine 60, a predetermined pulse signal of period T4 is outputted as the voltage boosting control signal Vbc, while a predetermined pulse signal of period T5 is outputted as the voltage boosting control signal Vbc in the routine 70. A predetermined pulse signal of period T6 is outputted as the voltage boosting control signal Vbc in the routine 80. A predetermined pulse signal of period T7 is outputted as the voltage boosting control signal Vbc in the routine 90. A predetermined pulse signal of period T8 is outputted as the voltage boosting control signal Vbc in the routine 100.

Here, the voltage boosting control signal Vbc of period T4 has a high level pulse width W4 and low level pulse width Wc and the pulse width W4 corresponds to a predetermined time t4. The predetermined time t4 is set to the value within the range of Ts+3.5×To<t2<Ts+4To. The voltage boosting control signal Vbc of period T5 has a high level pulse width W5 and low level pulse width Wc and the pulse width W5 corresponds to a predetermined time t5. However, the predetermined time t5 is set to the value in the range of Ts+4.5×To<t2<Ts+5To.

The voltage boosting control signal Vbc of period T6 has a high level pulse width W6 and low level pulse width Wc. The pulse width W6 corresponds to a predetermined time t6.

However, the predetermined time t6 is set to the value within the range of Ts+5.5×To<t6<Ts+6To. The voltage boosting control signal Vbc of period T7 has a high level pulse width W7 and low level pulse width Wc. The pulse width W7 corresponds to a predetermined time t7. However, the predetermined time t7 is set to the value within the range of Ts+6.5×To<t6 <Ts+7To. Moreover, the voltage boosting control signal Vbc of period T8 has a high level pulse width W8 and low level pulse width Wc. The pulse width W8 corresponds to a predetermined time 8. However, the predetermined time t8 is set to the value within the range of Ts+7.5×To<t6<Ts+8To.

Therefore, in the voltage boosting processing routine 60, the output voltage of battery 11 sequentially drops in unit of the voltage ΔVa for every fall of four times of the oscillation pulse signal Vosc during the high level of the voltage boosting control signal Vbc. Thus, the boosted voltage Vb is boosted for 10 times in unit of the voltage ΔVu for every rise of four times of the oscillation pulse signal Vosc. In the voltage boosting control routines 70 to 100, the number of times of voltage drops in unit of the voltage ΔV of the output voltage of battery 11 and the number of times of voltage boosting in unit of the voltage ΔVu of the output voltage of battery 11 increase one by one sequentially. Moreover, such processes are repeated for 10 times respectively in the voltage boosting control routines 70 to 100.

When the process of voltage boosting control routine 100 is completed, the processes of the voltage boosting control routines 110 and 120 (FIG. 4) are sequentially performed. The processes of the voltage boosting control routines 110 and 120 are substantially similar to above voltage boosting control routines except for the following processes.

In the voltage boosting control routine 110, the voltage boosting control signal Vbc outputted at step 112 has a predetermined period T9. This voltage boosting control signal Vbc has a high level pulse width W9 and low level pulse width Wc. The pulse width W9 corresponds to a predetermined time t9. The predetermined time t9 is set to the value within the range of Ts+8.5×To<t6<Ts+9To.

Moreover, in the voltage boosting control routine 120, the voltage boosting control signal Vbc outputted at step 122 has a predetermined period T10. This voltage boosting control signal Vbc has a high level pulse width W10 and low level pulse width Wc. The pulse width W10 corresponds to a predetermined time t10. The predetermined time t10 is set to the value within the range of Ts+9.5×To<t6<Ts+10To.

Moreover, in each step 113, 123 in both voltage boosting control routines 110, 120, N is updated through addition up to N=5. In each step 114, 124, the determination becomes YES when N=5. In the voltage boosting control routine 110, number of times of fall of the output voltage of battery 11 in unit of the voltage ΔVa. The number of times of rise of the output voltage of battery 11 in unit of the voltage ΔVu are larger than that in the voltage boosting control routine 100 by only once. The processes which are larger by only once are repeated for five times. Moreover, in the voltage boosting control routine 120, the number of times of fall of output voltage of battery 11 in unit of the voltage ΔVa. The number of times of rise of output voltage of battery 11 in unit of the voltage ΔVu are larger than that in the voltage boosting control routine 110 by only once. The processes which are larger by only once are repeated for five times.

When the process of the voltage boosting control routine 120 is completed, the power source voltage supply process to the transmitter circuit 18 is executed at step 130. Therefore, the transmitter circuit 18 is activate to enter the operating condition based on the smoothing voltage of the smoothing capacitor 17. At step 140, the output process of RF data is conducted. Thereby the transmitter circuit 18 processes the output data as the transmitting data with the signal processing circuit and then transmits this transmitting data from the antenna using the radio signal as a medium. Accordingly, the door-lock device D locks and unlocks the doors of the automobile based on the transmitting data from the transmitter circuit 18.

As explained above, the high level period of the voltage boosting control signal Vbc is sequentially set longer such as the predetermined period t1 to t10 in controlling the voltage boosting in the voltage boosting control routines 40 to 120 by effectively utilizing the relationship between the starting time Ts of voltage boosting of the voltage booster circuit 14 and boosted voltage Vb. Moreover, the low level period following the high level period is set as the predetermined period tc. The period from the predetermined periods t1 to t10 is set so that the number of oscillation pulse signals Vosc belonging to this period sequentially increases. The predetermined period tc is set to the period to recover the voltage drop of battery 11 to the voltage before the voltage drop.

Thereby, even if the output voltage of battery 11 drops due to deterioration by aging or the like, the output voltage of battery 11 can be boosted gradually within a short period of time up to the boosted voltage Vb of the predetermined voltage by the voltage booster circuit 14 without resulting in that the output voltage of battery 11 momentarily falls exceeding the lower limit value (Vth in FIG. 5) of the operating voltage range of the microcomputer 12 during each voltage boosting operation.

Here, since the number of oscillation pulses vosc increases while the predetermined period from t1 to t10 passes, the number of times of voltage boosting also sequentially increases. Thereby the voltage boosting may be realized smoothly within a short period of time.

Moreover, since the high level period of the voltage boosting control signal Vbc for each input of the voltage boosting control signal Vbc from the microcomputer 12 to the voltage booster circuit 14 is longer than the starting time of voltage boosting when the voltage boosting control signal Vbc is inputted to the voltage booster circuit 14, the boosted voltage Vb never saturates.

In addition, since the output voltage of battery 11 is not lowered, even momentarily, than the lower limit value of the operating voltage range of the microcomputer 12 during each voltage boosting operation, the microcomputer 12 always operates normally. As a result, the operation life of the signal transmitter 10 can be extended intensively.

Moreover, the relationship between the starting time Ts of voltage boosting and boosted voltage Vb is effectively utilized in consideration that the voltage boosting characteristic of the voltage booster circuit is identified with the above relationship on the occasion of boosting the output voltage of battery 11 up to the predetermined voltage with the voltage booster circuit 14. As a result, even if the output voltage is lowered due to deterioration of the battery 11, the voltage required for operation of the microcomputer 12 can be assured adequately without fluctuation and change of voltage boosting characteristic of the voltage booster circuit 14.

In the embodiment of the present invention, the oscillator circuit 14a in the voltage booster circuit 14 may be a switching circuit. It is also possible to realize the switching operation like the oscillating operation of the oscillator circuit 14a with such switching circuit.

Moreover, it is possible that a value of N is not limited to 10 or 5 in each voltage boosting control routine. The output voltage of battery 11 may be changed within the range for boosting such output voltage to the predetermined voltage within a short period of time.

Moreover, the low level pulse width of the voltage boosting control signal Vbc may be widened as much in the voltage boosting control signal Vbc which is generated later. Moreover, it is enough when the high level pulse width of the voltage boosting control signal Vbc is wider as much in the voltage boosting control routine to be executed later and such pulse with is never limited to the width explained above.

Moreover, the present invention is not limited to a the keyless entry system for automobiles, but may be used as a remote control signal transmitter for air-conditioners, home electric appliances, building doors and the like.

What is claimed is:

1. A signal transmitter comprising:
   a battery;
   a voltage boosting control signal generating means for
      sequentially generating a voltage boosting control signal through application of an output voltage of the battery as a power source voltage;

voltage boosting means including a switching means for generating a switching signal with a switching operation through input of the voltage boosting control signal to conduct a voltage boosting operation to boost the output voltage of the battery to a predetermined voltage based on the switching signal; and transmitting means operated with the boosted voltage for transmitting data, wherein a period of the voltage boosting control signal has a signal generation allowing period for allowing generation of the switching signal and a signal generation inhibiting period following the signal generation allowing period to inhibit generation of the switching signal, the signal generation allowing period being increased as time passes to increase a number of generation of the switching signal, wherein the switching means generates the switching signal during the signal generation allowing period of the voltage boosting control signal for every generation of the voltage boosting control signal and stops generation of the switching signal during the signal generation inhibiting period, and wherein the voltage boosting means boosts the output voltage of the battery stepwise to the predetermined voltage for every generation of the switching signal.

2. A signal transmitter as in claim 1, wherein:

the voltage boosting means includes a voltage booster circuit having a voltage boosting characteristic specified with a relationship between a starting time of voltage boosting and the boosted voltage;

the number of the switching signal generated in the signal generation allowing period is so determined that the output voltage of battery is held above a lower limit value of an operating voltage range of the voltage boosting control signal generating means with the switching operation of the switching means;

wherein voltage boosting up to the predetermined voltage is attained depending on the voltage boosting characteristic so that, in the signal generation inhibiting period of the voltage boosting control signal, the output voltage of battery may be recovered from the output voltage dropping in the signal generation allowing period.

3. A signal transmitter as in claim 2, wherein:

the signal generation allowing period of the voltage boosting control signal includes the starting time of voltage boosting when the voltage boosting control signal in the voltage boosting characteristic is generated; and wherein the voltage booster circuit starts the switching operation of the switching means during the signal generation allowing period, when the starting time of voltage boosting has passed for every generation of the voltage boosting control signal from the control signal generating means.

4. A signal transmitter comprising:

a battery;

a voltage boosting control signal generating means for sequentially generating a voltage boosting control signal pulses through application of an output voltage of the battery as a power source voltage;

a voltage boosting means for executing a switching operation through input of the voltage boosting control signal and also executing the voltage boosting operation to boost the output voltage of the battery up to a predetermined voltage based on the switching operation; and transmitting means operated with the boosted voltage for transmitting data as a radio signal, wherein the voltage boosting control signal generating means sequentially generates the voltage boosting control signal to further increase the number of times of the switching operation of the voltage boosting means as time passes thereby to recover a drop of the output voltage of battery caused by the switching operation.

5. A method of operating a signal transmitter having a battery and a signal transmitter circuit operable with an output voltage of the battery, the method comprising the steps of:

generating a voltage boosting control signal having an ON-period and an OFF-period at a first fixed frequency, the ON-period being increased as time passes;

generating a switching pulse at a second fixed frequency higher than the first fixed frequency during the ON-period of the voltage boosting control signal so that the number of switching pulse generated is increased in each ON-period as time passes; and boosting the output voltage of the battery in response to the switching pulse so that the transmitter circuit is operated with the boosted output voltage.

6. A method of operating a signal transmitter as in claim 5, wherein:

the ON-period is held uniform until the voltage boosting control signal is generated a predetermined number of times and being increased each time the voltage boosting control signal is generated another predetermined number of times following the predetermined number of times.

7. The signal transmitter of claim 1, further utilized in connection with a remote control.

8. The signal transmitter of claim 4, further utilized in connection with a remote control.

9. The method of claim 5, further comprising transmitting data as a radio signal from the signal transmitter.

10. The signal transmitter of claim 1, further comprising a microcomputer, wherein the microcomputer is configured to facilitate sending the data to the transmitting means, wherein the transmitting means transmits the data responsive to receipt thereof.

11. The signal transmitter of claim 4, further comprising a microcomputer, wherein the microcomputer is configured to facilitate sending the data to the transmitting means, wherein the transmitting means transmits the data responsive to receipt thereof.

12. The method of claim 9, wherein the data is transmitted from the signal transmitter responsive to receipt of the data at the signal transmitter.

13. The signal transmitter of claim 1, wherein the data is received by the transmitting means as radio frequency data.

14. The signal transmitter of claim 4, wherein the data is received by the transmitting means as radio frequency data.

15. The method of claim 12, wherein the data is radio frequency data.

* * * * *